(No Model.)

L. HOLT.
PNEUMATIC TIRED WHEEL.

No. 509,902. Patented Dec. 5, 1893.

WITNESSES:

INVENTOR:
Leopold Holt.

UNITED STATES PATENT OFFICE.

LEOPOLD HOLT, OF FRANKFORT-ON-THE-MAIN, GERMANY.

PNEUMATIC-TIRED WHEEL.

SPECIFICATION forming part of Letters Patent No. 509,902, dated December 5, 1893.

Application filed July 6, 1893. Serial No. 479,761. (No model.) Patented in England December 6, 1892, No. 22,352.

*To all whom it may concern:*

Be it known that I, LEOPOLD HOLT, a subject of the Queen of Great Britain, temporarily residing at Frankfort-on-the-Main, in the Empire of Germany, have invented a new and useful Improvement in Pneumatic-Tired Wheels, (for which I have obtained a patent in Great Britain, No. 22,352, bearing date the 6th of December, 1892,) of which the following is a specification.

My invention relates to an improved method of attaching the covers of pneumatic tires to wheel rims, and it consists in forming a circumferential central groove or channel in the wheel rim, in placing in one edge of the divided cover a hoop or ring of inelastic material the diameter of the said hoop or ring being smaller than the diameter of the rim at the edge of the central groove thereof, and in forming on the other edge of the cover a bead or enlargement adapted to fit in the groove in the wheel rim and engage with the hoop or ring in the other edge of the cover, the object being to secure the cover to the wheel rim in a more ready and simple manner than at present obtains. I attain this end in the manner illustrated in the accompanying drawings, in which:—

Figure 1:
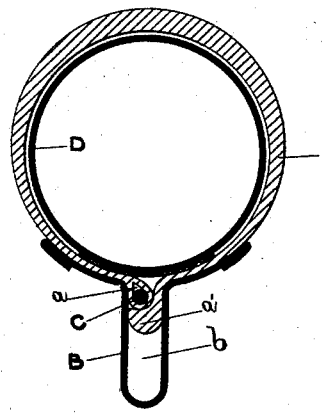
Figure 2:
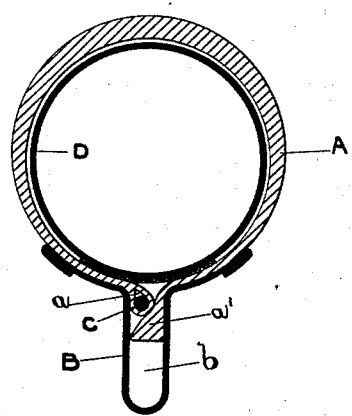

Figure 1 is a view in cross section of a pneumatic tire and wheel rim embodying my invention. Fig. 2 is a similar view showing a modification thereof, and Fig. 3 is a view in transverse section showing another form my invention may assume.

Similar letters refer to similar parts throughout the several views.

Figure 3:
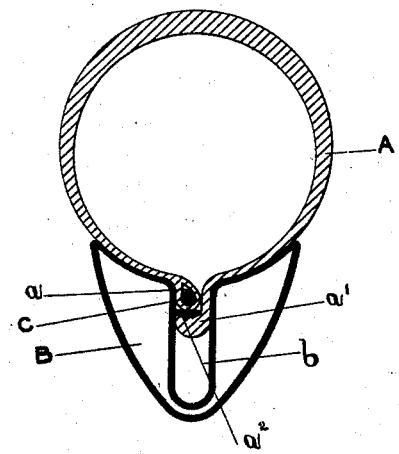

The rim of the wheel B which may be either of the solid type as shown by Figs. 1 and 2 or of the hollow type as shown by Fig. 3, is of the ordinary crescent shape with a deep circumferential groove "$b$" formed in its center.

The cover A which is made of rubber reinforced with canvas in the well-known manner has a pocket or recess "$a$" formed at one edge to receive an inelastic or longitudinally rigid hoop or ring C which is made of a smaller diameter than the rim measured at the edges of the central groove thereof. This hoop or ring C is made of wire or other suitable longitudinally rigid material. On the other edge of the cover is formed a bead or enlargement "$a'$" of rubber which is preferably not reinforced with canvas so that it may be sufficiently elastic to be placed into the groove "$b$" in the wheel rim. The shape of the bead or enlargement "$a'$" may be that shown by either Fig. 1 or Fig. 2 of the accompanying drawings and it is of a width equal to the width of the groove "$b$" in the wheel rim, so that when the inelastic edge of the cover is in the said groove the elastic edge "$a'$" cannot be drawn out of the said groove when the tire is inflated.

To attach the cover to the wheel rim, the edge having the elastic bead or enlargement "$a'$" is first placed in the groove "$b$" in the wheel rim by springing it therein and the other edge of the cover having the inelastic hoop or ring C is then placed in the groove "$b$" in the wheel rim by placing one part of it against the bead or enlargement "$a'$" in the groove in the rim and forcing both edges of the cover to the bottom of the said groove, which allows the opposite part of the inelastic edge of the cover to be passed over the opposite edge of the wheel rim into the groove "$b$" therein. On the inflation of the air tube D which is of the usual construction the two edges of the cover become engaged whereon the tire becomes securely attached to the wheel rim.

By making the cover A air-proof which is conveniently done by lining its interior surface with rubber, and by inserting between the elastic beaded edge "$a'$" of the cover and the inelastic cored edge "$a$" thereof, a strip "$a^2$" of any suitable soft yielding substance such as unvulcanized rubber, gelatine, or a compound of gelatine glucose and glycerine so as to make an air tight joint between the two edges of the cover as shown by Fig. 3, the air tube D may be dispensed with.

I wish it to be particularly understood that I do not limit myself to the precise details of construction hereinbefore described and illustrated, but that I hold myself at liberty to make such changes and alterations as fairly fall within the spirit and scope of my invention.

What I claim as my invention, and desire to secure by Letters Patent, is—

1. In a pneumatic tired wheel, the combination with a crescent shaped rim having a central groove or channel, of a divided cover constructed of rubber reinforced with canvas in the well-known manner and having a pocket formed in one of its edges in which is located an unstretchable or longitudinally rigid hoop or ring and having an elastic bead or enlargement on its other edge, and of an air tube for inflating the tire, as set forth.

2. In a pneumatic tired wheel, the combination of a crescent shaped rim having a central circumferential groove or channel, of a divided cover constructed of rubber reinforced with canvas and having one of its edges rendered inelastic or longitudinally rigid by the insertion of a core of wire or other suitable material and having on its other edge an elastic bead or enlargement adapted to fit in the groove in the wheel rim and shaped to engage with the inelastic or longitudinally rigid edge of the cover, and of an air tube for inflating the tire, as set forth.

3. In a pneumatic tired wheel, the combination of a crescent shaped rim having a central groove or channel, of a divided cover constructed of rubber reinforced with canvas and having one of its edges rendered inelastic or longitudinally rigid by the insertion of a core of wire or other suitable material and having on its other edge an elastic bead or enlargement adapted to fit in the groove in the wheel rim and shaped to engage with the inelastic or longitudinally rigid edge of the cover, and of a strip of soft yielding material placed between the two edges of the cover to form an air tight joint, as set forth.

LEOPOLD HOLT.

Witnesses:
W. H. JAMES,
G. T. CLARK,
*Both of 70 Chancery Lane.*